United States Patent [19]

Langdon, Jr. et al.

[11] Patent Number: 4,566,044
[45] Date of Patent: Jan. 21, 1986

[54] DIRECTION-CONSTRAINED TERNARY CODES USING PEAK AND POLARITY DETECTION

[75] Inventors: Glen G. Langdon, Jr.; Paul H. Siegel, both of San Jose, Calif.

[73] Assignee: International Business Machines Corporation, Armonk, N.Y.

[21] Appl. No.: 665,807

[22] Filed: Oct. 29, 1984

[51] Int. Cl.$^4$ ............................ G11B 5/09; H04L 3/00
[52] U.S. Cl. ......................................... 360/40; 371/56; 340/347 DD; 375/17
[58] Field of Search ............................ 360/40; 371/56; 340/347 DD; 375/17

[56] References Cited

U.S. PATENT DOCUMENTS

| | | | |
|---|---|---|---|
| 3,133,274 | 5/1964 | Larkin | 360/40 |
| 3,226,685 | 12/1965 | Potter et al. | 360/40 X |
| 3,618,044 | 11/1971 | Cupp | 364/900 |
| 3,866,147 | 2/1975 | De Couvreur et al. | 371/56 X |
| 4,096,526 | 6/1978 | Furata | 375/17 X |
| 4,097,859 | 6/1978 | Looschen | 375/17 X |
| 4,244,051 | 1/1981 | Fujikura et al. | 340/347 DD X |
| 4,506,252 | 3/1985 | Jacoby et al. | 360/40 X |

Primary Examiner—Aristotelis M. Psitos
Assistant Examiner—Alyssa H. Bowler
Attorney, Agent, or Firm—R. Bruce Brodie

[57] ABSTRACT

A class of ternary square wave signals is detectable by peak polarity detection alone without need for amplitude discrimination. The ternary codes are used to increase data density recording at the same clock rate as binary codes. This is satisfied by selective direction-constrained run length limited (RLL) signals. The direction constraint is that the half-step transitions can only occur in pairs of the same polarity. Alternate half-step pairs of opposite polarity are forbidden. This avoids the need for amplitude discrimination. The RLL (d,k) constraint includes "d" number of clock times when a transition is forbidden and "k>d" clock times within which consecutive transitions must occur. The latter determines a minimum frequency for clocking purposes. This eases peak shift detection.

5 Claims, 12 Drawing Figures

CONVERSION OF DATA TO THREE LEVELS - POSITIVE, NEGATIVE OR ZERO

A FULL-TERNARY (1,3) CHANNEL WAVEFORM

A DIRECTION-CONSTRAINED TERNARY (1,3) CHANNEL WAVEFORM

CONVERSION OF DATA TO THREE LEVELS - POSITIVE, NEGATIVE OR ZERO

| PRESENT STATE | TERNARY VALUE | NEXT STATE | EFFECT ON WAVEFORM |
|---|---|---|---|
| P | 0 | P | NONE |
| N | 0 | N | NONE |
| K | 0 | K | NONE |
| L | 0 | L | NONE |
| P | 1 | N | FULL NEGATIVE |
| N | 1 | P | FULL POSITIVE |
| K | 1 | | VIOLATION OF DIRECTION CONSTRAINT |
| L | 1 | | VIOLATION OF DIRECTION CONSTRAINT |
| P | 2 | K | HALF NEGATIVE TO 0 |
| N | 2 | L | HALF POSITIVE TO 0 |
| K | 2 | N | HALF NEGATIVE TO N |
| L | 2 | P | HALF POSITIVE TO P |

STATE CONVERSION OF TERNARY VALUES
AND EFFECT ON WAVEFORMS

FIG. 4

|   | 000 | 001 | 010 | 011 | 100 | 101 | 110 | 111 |
|---|---|---|---|---|---|---|---|---|
| A | 0101/A | 0101/B | 0010/C | 0010/D | 0010/E | 0100/F | 0100/G | 0100/H |
| B | 0001/A | 0001/B | 0202/A | 0202/B | 0102/K | 0002/K | 0020/K | 0020/L |
| C | 0101/A | 0101/B | 1010/C | 1010/D | 1010/E | 0100/F | 0100/G | 0100/H |
| D | 1001/A | 1001/B | 0010/C | 0010/D | 0010/E | 1000/I | 1000/J | 1002/K |
| E | 2002/A | 2002/B | 0202/A | 0202/B | 2020/C | 2020/D | 2020/E | 2000/L |
| F | 0101/A | 0101/B | 1010/C | 1010/D | 1010/E | 0100/F | 0100/G | 0100/H |
| G | 1001/A | 1001/B | 1020/K | 1020/L | 0102/K | 1000/I | 1000/J | 1002/K |
| H | 2002/A | 2002/B | 0202/A | 0202/B | 2020/C | 2020/D | 2020/E | 2000/L |
| I | 1001/A | 1001/B | 1010/C | 1010/D | 1010/E | 1000/I | 1000/J | 1002/K |
| J | 2002/A | 2002/B | 1020/K | 1020/L | 2020/C | 2020/D | 2020/E | 2000/L |
| K | 0201/A | 0201/B | 0200/F | 0200/G | 0200/H | 0020/C | 0020/D | 0020/E |
| L | 2001/A | 2001/B | 2010/C | 2010/D | 2010/E | 2020/K | 2020/L | 2000/I |

ENCODING TABLE FOR DIRECTION-CONSTRAINED TERNARY (1,3) CODE

FIG. 5

| 000 | 001 | 010 | 011 | 100 | 101 | 110 | 111 |
|---|---|---|---|---|---|---|---|
| 0101/Q | 0101/S | 0010/R | 0010/U | 0010/X | 0100/R | 0100/W | 0100/X |
| 0001/Q | 0001/S | 0202/Q | 0202/S | 0102 | 0002 | 0020/T | 0020/V |
| 0201/Q | 0201/S | 0200/R | 0200/W | 0200/X | 0020/R | 0020/U | 0020/X |
| 1001/Q | 1001/S | 1010/R | 1010/U | 1010/X | 1000/Y | 1000/Z | 1002 |
| 2002/Q | 2002/S | 1020/T | 1020/V | 2020/R | 2020/U | 2020/X | 2000 |
| 2001/Q | 2001/S | 2010/R | 2010/U | 2010/X | 2020/T | 2020/V | |

LOOK-AHEAD BLOCKS:

| Q | R | S | T | U | V | W | X | Y | Z |
|---|---|---|---|---|---|---|---|---|---|
| 0101 | 0101 | 0001 | 0201 | 1001 | 2001 | 1001 | 2002 | 1001 | 2002 |
| 0010 | 1010 | 0202 | 0200 | 0010 | 2010 | 1020 | 0202 | 1010 | 1020 |
| 0100 | 0100 | 0102 | 0020 | 1000 | 2020 | 0102 | 2020 | 1000 | 2020 |
| | | 0002 | | 1002 | 2000 | 1000 | 2000 | 1002 | 2000 |
| | | 0020 | | | | 1002 | | | |

DECODING TABLE FOR DIRECTION-CONSTRAINED TERNARY (1,3) CODE

BLOCK DIAGRAM TO CONVERT DIFFERENTIATED
WAVEFORM TO TERNARY

```
TERNARY:      0   2   0   2   0   0   1   0   0   1   0   2   0   2   0
(INPUT)
RESULTING WAVEFORM (FIGURE 4)
```

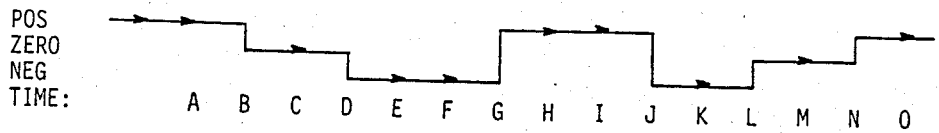

```
TIME:         A   B   C   D   E   F   G   H   I   J   K   L   M   N   O
```

(A) ORIGINAL WAVEFORM WRITTEN.

AT THE OUTPUT (DEMODULATOR OF DIFFERENTIATED WAVEFORM)

```
PEAK:         0   1   0   1   0   0   1   0   0   1   0   1   0   1   0
POLARITY:     0   1   0   1   0   0   0   0   0   1   0   0   0   0   0
```

(B) OUTPUT OF PEAK DETECTOR CIRCUIT (FIGURE 7)

```
PREVIOUS (0 IS POS, 1 IS NEG)
POLARITY:     0   0   1   1   1   1   1   0   0   0   1   1   0   0   0
(STEPS 1 AND 2 OF PEAK-TO-TERNARY ALGORITHM)
```

```
PEAK POLARITY SAME
AS PREVIOUS?      -  NO  -  YES  -  -  NO  -  -  NO  -  NO  -  YES  -
(FOR STEP 3 OF PEAK-TO-TERNARY ALGORITHM)
```

TRANSITION (INITIAL: No → 1, Yes → 2)

```
INITIAL       0   1   0   2   0   0   1   0   0   1   0   1   0   2   0
(STEPS 4 AND 5)

FINAL TYPE:   2*  "   "   "   "   "   "   "   "   "   "   2*  "   "   "
(STEP 6, " INDICATES INITIAL TERNARY DIGIT IS FINAL TERNARY DIGIT)
```

(C) CALCULATION OF FINAL DIRECTION-CONSTRAINED TERNARY AT OUTPUT,
    FIRST MAKING INITIAL DETERMINATION, THEN FINAL DETERMINATION.

```
TERNARY:      0   2   0   2   0   0   1   0   0   1   0   2   0   2   0
(OUTPUT)
```

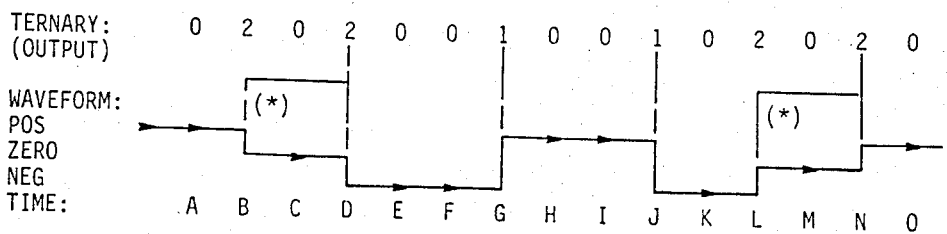

```
TIME:         A   B   C   D   E   F   G   H   I   J   K   L   M   N   O
```

(D) WHERE DELAY OCCURS ON THE WAVEFORM, IN CONVERTING '1' TO '2'

\* - DELAYED CHANGE, FOLLOWING RECEIPT OF SECOND HALF-STEP, ACCORDING TO
    STEP 6 OF PEAK-TO-TERNARY ALGORITHM

EXAMPLE OF WAVEFORM-TO-TERNARY CONVERSION

FIG. 8

| INPUT VALUES PEAK | POL | PREV-POL | OUTPUT VALUES PEAK | HALF | NEXT STATE PREVPOL | COMMENT |
|---|---|---|---|---|---|---|
| 0 | 0 | 0 | 0 | 0 | 0 | TERNARY 0, PREV POL SAME |
| 0 | 0 | 1 | 0 | 0 | 1 | TERNARY 0, PREV POL SAME |
| 1 | 0 | 0 | 1 | 1 | 0 | TERNARY 2 (NOTE 1, 2) |
| 1 | 0 | 1 | 1 | 0 | 0 | TERNARY 2 (NOTE 1, 3) |
| 1 | 1 | 0 | 1 | 0 | 1 | TERNARY 1 (NOTE 1, 3) |
| 1 | 1 | 1 | 1 | 1 | 1 | TERNARY 1 (NOTE 1, 2) |

NOTES:

1. The Next value of 'Prev Pol' is the current value of 'Pol'.

2. Since the previous 'Pol' and current 'Pol' are the same, this is the second half-transition, and the previous peak value must be changed from 1 to 2. The activation of signal HALF is the key signal to effect the change by Part B of the Peak-to-Ternary embodiment.

3. Since the previous 'Pol' is different, this could be either the first half-transition of a two-transition pair, or a full transition. The next peak polarity will tell the story. If the polarity is the same, the previous peak must be changed; if different, the initial value of '1' is correct.

STATE MACHINE TO CONVERT PEAK DETECTION TO INITIAL
DIRECTION-CONSTRAINED TERNARY CODE AT DEMODULATOR

FIG. 9

CIRCUIT TO CONVERT PEAK DETECTOR OUTPUT TO BINARY CODED DIRECTION CONSTRAINED TERNARY CODE

```
BLOCKED
BINARY              . 001 . 110 . 010 . 100 . 111
ENCODER
STATE              A.    B.    K.    F.    E.    L.

ENCODER
OUTPUT              . 0101 . 0020 . 0200 . 1010 . 2000
```

```
BLOCKED
RECOVERED           . 0101 . 0020 . 0200 . 1010 . 2000 .
TERNARY

0101/S
                         0200/T
BLOCK/LOOKAHEAD           0200/R
ENTRY                          1010/X
                                    2000

DECODER             . 000 . 110 . 010 . 100 . 111
OUTPUT
```

BLOCKED BINARY-TO-TERNARY/TERNARY-TO-BINARY CONVERSION

FIG. 12

DIRECTION-CONSTRAINED TERNARY CODES USING PEAK AND POLARITY DETECTION

TECHNICAL FIELD

This invention relates to a method and apparatus for coding binary symbol strings into ternary symbol strings and synchronously recording said ternary symbol strings onto a magnetic medium such that clocked recovery of the recorded signal may subsequently be made using only peak and polarity detection.

BACKGROUND OF THE INVENTION

In the prior art, Cupp, U.S. Pat. No. 3,618,044, discloses and claims a method and apparatus for converting binary into ternary recording codes and transforming the ternary symbol strings into a clocked multilevel recording signal and imprinting said recording signal upon a magnetic medium. Cupp, however, is concerned with and processes absolute signal levels rather than signal transitions.

Larkin, U.S. Pat. No. 3,133,274, converts a ternary symbol string into a binary (2-level) write current waveform, which waveform is then used for saturation recording. Further, Larkin uses a synchronous clock and a peak/polarity detector for recovering the saturated recorded code symbols. Central to his invention is the notion of decoding a detected positive peak as a "2", and a negative peak as a "1". In Larkin, the absence of a peak is taken to be a "0". It should be appreciated that, in saturation recording, a negative and positive peak must alternate. Thus, it would not be possible to record and recover a string in Larkin of "2" followed by "2". That is, one could not force two consecutive peaks to both be positive. This is avoided in Larkin by inserting a dummy negative peak in-between the positive peaks corresponding to the "2" symbols. This superflous negative peak will not occur at a code bit time as marked by the clock. Therefore, Larkin discards all such superflous or dummy peaks which were inserted solely to conform to the necessary peak polarity alternation as the detected peaks are decoded into code symbols. However, Larkin ignores the effect of insertion of superflous transitions in the write signal "in-between clock times" which is the shifting of peaks from their expected positions. Peak insertion will increase the detection error unless the clock is slowed down and recording density is lost.

THE INVENTION

It is an object of this invention to ascertain a class of ternary square wave signals detectable by peak position and polarity detection alone without need for amplitude discrimination, ternary codes being used to increase data density recording at the same clock rate as binary codes.

This object is satisfied by use of selective direction-constrained run length limited (RLL) signals. The direction constraint imposes the rule that half-step transitions can only occur in pairs of the same polarity. Alternate half-step pairs of opposite polarity are forbidden. Forcing the peaks corresponding to half-step transitions to occur in consecutive pairs with the same polarity avoids the need for amplitude discrimination. The RLL (d,k) constraint includes a "d" number of clock times when a transition is forbidden and "k>d" clock times within which consecutive transitions must occur. The latter determines a minimum frequency for clocking purposes while the former eases the peak shift problem by optimizing the minimum transition spacing.

More particularly, the invention is manifest as a method for coding binary symbol strings into ternary symbol strings and synchronously recording said ternary symbol strings onto a magnetic medium such that clocked recovery of the recorded signal may be subsequently made using only peak position and polarity detection. The method comprises the steps of (a) mapping a binary symbol string into a direction-constrained run length limited (RLL) ternary symbol string (e.g. r-bit or variable length blocking of a binary symbol string; converting the blocked symbol string into a run length limited n>r-bit blocked ternary symbol string at a predetermined rate); (b) transforming the ternary symbol string into a clocked multilevel recording signal, said recording signal including signal levels in the range $-a<0<+a$, transitions between levels being made as either full-steps ($+a$ to $-a$, $-a$ to $+a$), or halfsteps (0 to $\pm a$ or $\pm a$ to 0), consecutively occurring half-steps being limited to pairs of like polarity ($+a$, $+a$; $-a$, $-a$), half-steps of alternate polarity ($+a$, $-a$; $-a$, $+a$) being excluded; and (c) imprinting a magnetic medium with the recording signal.

The invention also includes a method for recovering the duly recorded signal from a magnetic medium. Signal recovery occurs in a high-density, high-data rate nonsaturated magnetic recording environment. The signals consist of the waveforms derived in step (b) above from a (d,k) run length limited, direction-constrained, ternary symbol encoding of binary symbol strings. Recovery uses peak position and polarity detection for readback thereof. The method steps for binary symbol string recovery comprises (a) reading back the recorded signals and detecting therefrom the presence of magnitude peaks and their polarities; (b) converting the detected peak polarities to ternary code symbols, the conversion includes a maximum delay of $k+1$ clock times; and (c) inverse mapping of the recovered ternary string into the binary data, e.g. blocking the ternary symbols into length n and obtaining $r<n$ length binary symbols by way of table lookup and a lookahead of a predetermined number of ternary symbol blocks. Relatedly, in the recovery method, the delay is used to permit context decoding of half-steps, and further, the number of ternary symbol lookahead blocks is a function of the (d,k) constraint and the code rate (r/n).

With reference to the prior art, it should be noted for example, that Cupp, unlike this invention, fails to impose either an RLL constraint or consecutive halfpulse pairs of like polarity constraint therein. Consequently, Cupp, unlike the invention, fails to overcome the peak shift problem resolved by the invention. Further, Cupp apparently relies upon an equalizer to compensate for the amplitude difference between half- and full-step peaks.

In contrast with the invention, the dummy transitions of Larkin would probably cause severe peak shift which would lead to errors in clocking the detected peaks. As a result, some type of run length limited code would be necessary to achieve high recording density. Lastly, Larkin does not address the loss of potential data density occasioned by his use of dummy transitions. The insertion of these transitions merely adds redundancy rather than information to the recorded string.

BRIEF SUMMARY OF THE DRAWING

FIG. 4 sets out a finite state machine representation of the direction-constrained ternary-towaveform conversion of FIG. 3.

FIG. 5 lays out an encoding table for a rate ¾ direction-constrained ternary (1,3) code.

FIG. 8 illustrates a clocked waveform-to-ternary conversion according to the invention.

FIG. 9 shows a state machine in abstract (tabular) form for converting waveform peak detection events into a direction-constrained ternary code.

FIG. 12 illustrates blocked binary to RLL direction-constrained ternary and vice versa.

DESCRIPTION OF THE PREFERRED EMBODIMENT AND INDUSTRIAL APPLICABILITY

Current approaches to recording digital information on magnetic media use only two levels of magnetization. That is, the medium is saturated in either one of two polarities. With AC bias recording, it becomes possible to achieve discrete levels of magnetization on magnetic media such as disks or tapes.

In contrast to the art, this invention utilizes three states of "levels". The three states are saturated minus (−a), saturated plus (+a), and degaussed (0). In the method and apparatus of this invention, the medium passes under a read/write head and time is divided into "bit periods" or recording channel time units.

When two levels of recording are employed, a detector need only detect the existence of a flux reversal and assign it to a bit period or channel time unit. Information concerning the direction of the flux reversal is redundant. If coding is employed which can utilize both the existence and direction of flux reversals, then more information can be packed into code strings. When three levels are used, reference may be made to a "ternary channel". Run length constraints may be applied to a ternary channel where the constraints define when transitions are allowed relative to the last transition. When no other constraints are applied, there exists a full-ternary RLL channel. For a full-ternary RLL channel, there are two choices for each transition. That is, a transition can go from +a to −a or 0, or from 0 to −a or +a, or from −a to 0 or +a. The detector must be able to discriminate between a transition from +a to 0, and +a to −a, by the magnitude of the detected flux reversal. Thus, two thresholds are required; that is, a threshold between noise and a half-reversal (+a to 0), and a threshold between a half-reversal and a fullreversal (+a to −a).

Figure 1:
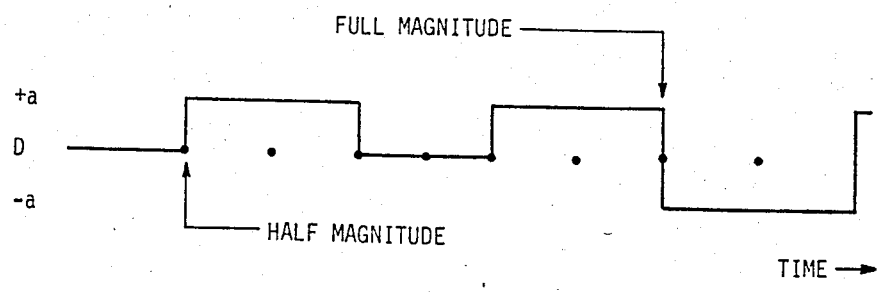
FIG. 1 depicts a full-ternary channel waveform.

Referring now to FIG. 1, there is shown a waveform for a full-ternary (1,3) constraint. This is an extension of the binary (1,3) constraint where there is a requirement to have a flux reversal no sooner than (d+1) time units but no later than (k+1) time units after the last flux reversal, d being 1 and k being 3. Once the two time units have occurred following the last flux change, the ternary channel may have a transition to any of the other two channel states. In this invention, the direction constraints relieve the detector of the need for a double threshold and yet achieve increased information carrying capacity in the use of three recording levels.

Figure 2:
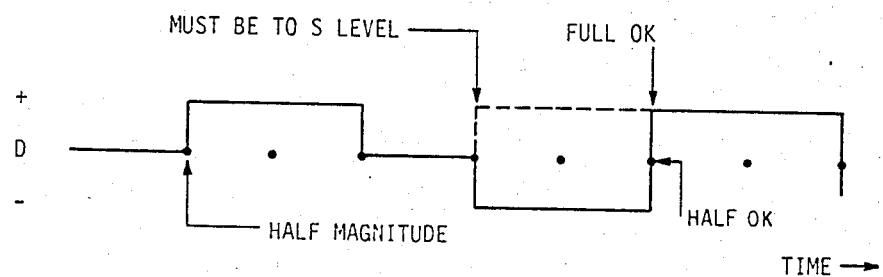
FIG. 2 shows a direction-constrained ternary channel waveform.

Referring now to FIG. 2, there is shown a direction-constrained ternary channel waveform. In considering the "problem transitions" of the full-ternary (1,3) channel, it is necessary to distinguish the half-transition (+a to 0) from the full-transition (+a to −a) and the similar transitions from the recording state −a. To alleviate the problem transition, suppose there is introduced the requirement that a (+a to 0) transition be followed by a (0 to −a) transition. That is, one leaves the 0 state in the same direction as one enters it. Now, there is no need to discriminate between the half- and full-magnitudes of the flux reversals on the basis of the observed peak amplitudes in the readback signal if the polarity of the next observed peak is noted. If there are obtained two successive peaks of the same polarity, the flux transition corresponding to the first peak must have been a half-magnitude transition, as well as the flux transition corresponding to the second peak. After having determined the polarity of the next peak, a determination can be made as to whether the previous transition was of half- or full-magnitude.

Figure 3:
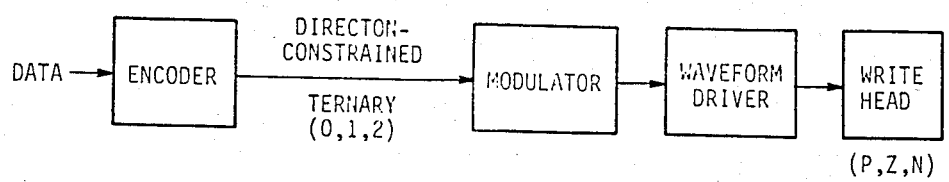
FIG. 3 exhibits a block diagram representation of direction-constrained ternary code-to-waveform conversion.

Referring now to FIG. 3, there is shown a logical block diagram conversion of a binary datastream into a form of coding suitable for energizing either a positive P, zero Z, or negative N amplitude level to be impressed upon a suitable recording medium. For a (1,3) code, the binary data is blocked three bits at a time and applied to encoder 1. The encoder employing a directionconstrained binary-to-ternary transformation generates a sequence of ternary code symbols, any symbol of which may assume the value of 0, 1, or 2. In turn, the modulator 3 and waveform driver 5 transform the ternary code string into a sequence of amplitude levels (p, z, or n) which is applied by write head 7 to a magnetic recording medium.

In this and the following discussion, reference will be made to finite state machine (FSM) representation and design. Thus, the following Wulf et al, "Fundamental Structures of Computer Science", Addison-Wesley Publishing Co., ISBN 0-201-08725-1, pp. 9–48, the machine equivalent of digital computing transformations can be represented by an FSM having an input symbol set, an output symbol set, a set of internal states, a first function for mapping an ordered pair drawn from an input symbol, and a present internal state into a next internal state and a second function for mapping an ordered pair of input symbols and internal states into an output symbol. In this regard, one could consider the conversion of a binary bit string into magnetic recording levels as to be formed by two successive FSM's. The first is formed by encoder 1 and the second consisting of modulator 3, waveform driver 5, and write head 7.

Referring now to FIG. 5, there is shown an encoding table representation of such an FSM for encoder 1. Since a (1,3) direction-constrained ternary code is to be produced at the output of said encoder, the input binary bit string is applied thereto three bits at a time. Thus, there are eight possible 3-bit input combinations. These are represented by appropriate columns in FIG. 5. Each of the eleven row entries labeled A, B, C, ..., L designates a counterpart internal state of the FSM of encoder 1, Likewise, the row and column entry defines the ternary output and the next internal state to be assumed by the encoder. Thus, if the 3-bit input combination "100" were applied to the encoder which was in state G, then the output would be "0102" with the next internal state being "K" assumed by said encoder for a next input combination of, say "010", and the encoder in state K, the output would be "0200" with the next state being F.

Referring now to FIG. 4, there is shown the tabular representation of an FSM which takes ternary values, one at a time, as inputs and produces direction-constrained amplitude levels as a waveform output suitable for recording on a magnetic medium. In this second FSM, four internal states are represented, these being P, N, K, and L. As an operative example for an input ternary value of 0 and an internal state of N, then the next state is N and there is no change to the waveform output. If this is followed by the next ternary value of 1 with the FSM being in state N, then the next state is P and the waveform output is full positive. Suppose the very next ternary value were 2 with the present state P, then the next state would be K and the output would be half-negative to 0. Also, in the FSM of FIG. 4, two row entries namely for present states K and L having a ternary value input of 1 have neither a next state nor affect on the waveform. Indeed, these are forbidden. Such a circumstance represents full-steps from degaussed state (0), which is impossible.

Figures 6, 7:
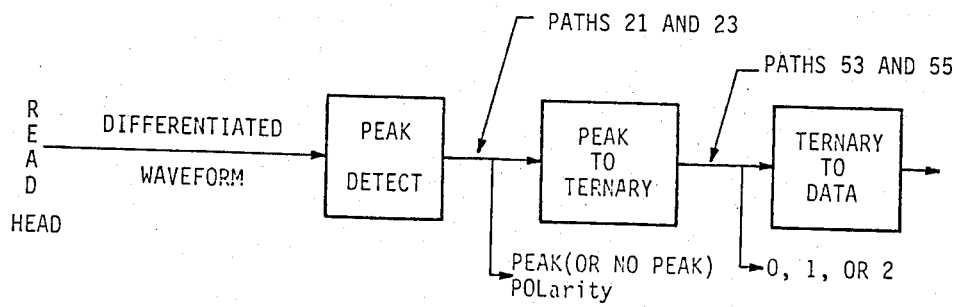
FIG. 6 depicts a decoding table for the code in FIG. 5.
FIG. 7 sets out a block diagram for the recovery of the ternary-encoded signal.

Referring now to FIGS. 5 and 6, the directionconstrained ternary (1,3) code is of the "sliding block" type with state-dependent encoding and finite lookahead decoding. The code has a rate ¾ corresponding to an efficiency of 92 percent. The sliding block code type was popularized by Adler et al, "Algorithms for Sliding Block Codes", IEEE Transactions on Information Theory, pp. 5-22, January 1983.

In order to recover the original bit string from the recorded waveforms on a magnetic medium, it is first necessary to access said waveforms, convert them to ternary code, and then execute a ternary-to-binary transformation. In this regard, FIG. 7 depicts a block diagram to convert a differentiated waveform to a ternary code string. In this matter, a read head is a differentiator picking up only the changes in recorded amplitude level. The derivative waveform is sent to conventional peak detection circuitry which provides two logic signals as outputs. The first output indicates whether there was a peak detected at a given clock time. The second output is obtained from a conditional circuit. This circuit ascertains whether a peak was detected. If the binary information state of the conditional circuit was zero, then the peak was positive. Otherwise, the detected peak was negative. As noted, the peak detector output is fed to the peak-to-ternary finite state machine which converts this information back to the original direction-constrained ternary information. The peak-to-ternary FSM imposes a delay for the results because the half-peaks require the next peak to be detected before the ternary symbol can be fully resolved. That is, recovery of the ternary code string is by decoding in context. An example of this may be seen by referring to FIG. 8.

FIG. 6 shows a decoding table, including lookahead blocks, for a particular implementation of a fixed length, rate ¾, direction-constrained RLL (1,3) code. FIG. 12 illustrates the conversion of blocked binary data to a ternary string. The internal state of the encoder is shown at each step, along with the ternary output of the encoder. FIG. 12 also illustrates the decoding of the blocked recovered ternary string (the output of the peak-to-ternary demodulator algorithm) to the binary data string. The use of finite lookahead (no more than 1 block of 4 ternary symbols) to recover the original binary string is shown.

Referring now to FIG. 8, there is shown an example of waveform-to-ternary conversion. The topmost waveform (a) shows the waveform as originally written. It begins at the initial level POS. There are six transitions between the three levels shown. The levels are POS, 0, and NEG. The clock periods are represented by four character spaces and are labeled a, b, ..., o. Beneath this waveform is a row which shows the output of the recovery FSM which reads the signal and encodes it into a 2-bit code. In this 2-bit code, 00=no peak, 1x=peak, 10=positive peak, and 11=negative peak. These output signals drive the peak-to-ternary algorithm whose output is the original direction-constrained ternary code, i.e. the output from encoder 1.

The peak-to-ternary demodulation algorithm, which should be read together with FIG. 8, consists of six steps. For purposes of demodulation, the algorithm is entered each clock time, when the peak detector has new output values for peak and polarity. The algorithm steps include:

Step 1. If there is no peak, then the final ternary symbol is 0 after which exit the algorithm.

Step 2. If there is a peak from step 1, record its polarity as the new previous polarity (PREVPOL) for the next clock time and go to the next step.

Step 3. Given that there is a peak, then compare the current polarity (POL) with PREVPOL and then go to the next step.

Step 4. If POL is opposite to PREVPOL, provisionally assign symbol "1" to this clock time and exit. If the polarities are not opposite, then go to the next step.

Step 5. Assume that there is a peak and current polarity (POL) which is the same as PREVPOL. Consequently, assign symbol "2" to this peak and go to the next step.

Step 6. Assign symbol "2" as the final value to the previous peak, which had been initially assigned a value of "1" and exit.

Note that FIG. 8(d) shows where the delay in the recovered ternary sequence occurs relative to the waveform. That is, the first half-transition at time "b" is delayed as is the second to last at time "1".

Figure 10:
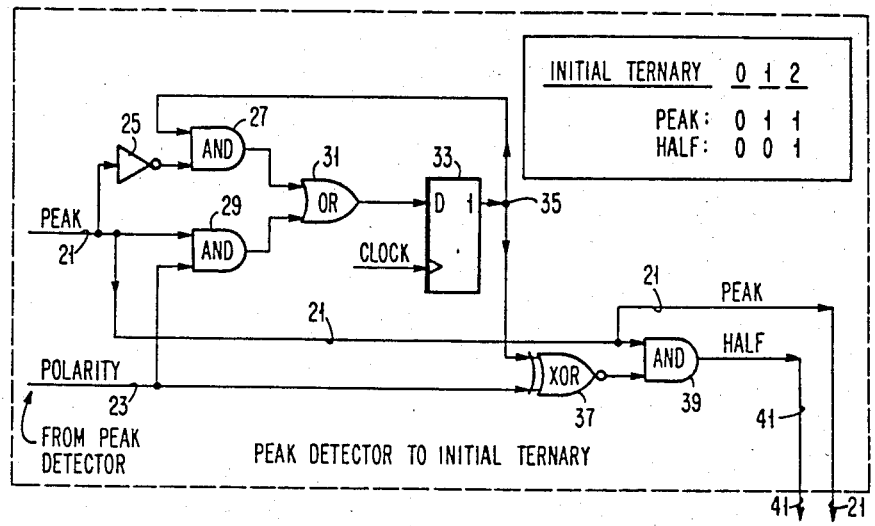
FIGS. 10 and 11 exhibit a circuit for recovery of the (1,3) direction-constrained ternary code from a peak and polarity detected waveform.
Figure 11:
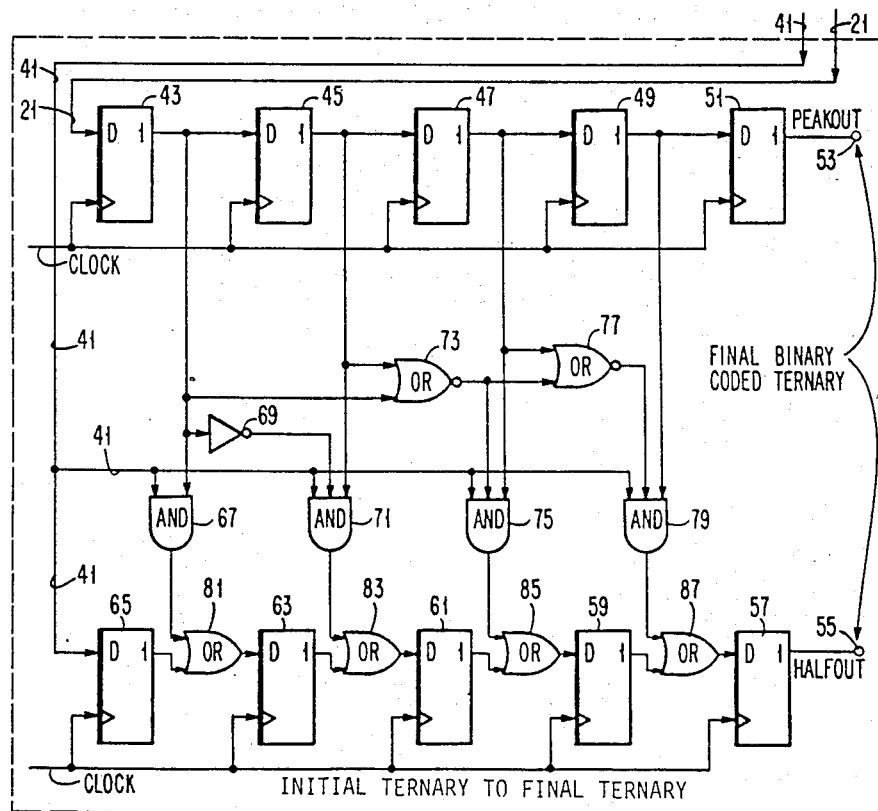

Referring now to FIG. 9, when taken together with FIGS. 10 and 11, there is shown an embodiment for converting the detected peaks and polarities of the differentiated readback signal obtained from the magnetic storage medium to the direction-constrained ternary code. FIG. 10 is directed to circuits for transforming the peak and polarity detection into an initial ternary signal set, while FIG. 11 takes this intermediate level and converts it to a final direction-constrained ternary code sequence. With reference to the peak-to-ternary (demodulation) algorithm, the circuit of FIG. 10 implements steps 1-5 while the circuit of FIG. 11 performs step 6. It should be recalled that steps 1-5 of the algorithm are directed to tracking the previous polarity and the initial value of a recorded symbol, while step 6 determines when the initial value of "1" for a clock time needs to be changed and then renders that change.

Referring now to FIG. 9, there is shown a table defining a FSM to convert peak detection to initial direction-constrained ternary code. Referring to FIG. 10, the indication of peak detection is applied to path 21 while that of polarity is applied to path 23. Relevantly, all of the flipflops in the embodiments shown in FIGS. 10 and 11 are of the D type and are edge triggered. In this regard, reference should be made to G. G. Langdon, Jr., "Computer Design", Computeach Press, Inc., San Jose, Calif., ISBN 0-9607864-0-6, pp. 512–518, copyright 1982. See also Montgomery Phister, "Logical Design of Digital Computers", Wiley, N.Y., 1958. Flipflop 33 is responsive either to the existence of detected peaks and polarities over paths 21 and 23 through AND gate 29 and OR gate 31, or the absence of a peak on path 21 and a set condition of flipflop 33 set back over path 35 through AND gate 27 and OR gate 31. Note, that the absence of a peak on path 21 appears as an input to AND gate 27 through inverter 25. Path 21 is applied to AND gate 39 as well as forming an input to the first stage 43. The polarity signal applied on path 23 together with the output of flipflop 33 on path 35 is applied to an exclusive OR Invert gate 37. To determine if the previous two peaks had the same polarity, a signal representative of a half-transition on path 41 is derived from AND gate 39 responsive to the output of exclusive OR Invert gate 37 and the peak signal condition on path 21. The output of FIG. 10 is the initial ternary determination, as shown in the top row of FIG. 8(c). FIG. 11 is the circuit which converts the initial ternary to the final ternary (i.e. which goes from the top row of FIG. 8(c) to the third or bottom row of FIG. 8(c), via step (6) of the peak-to-ternary demodulation algorithm. The final binary-coded ternary output appears in the form of signals on paths 53 and 55 respectively of FIG. 11. The peak out on path 53 is obtained as the last state output of a right shifting peak register formed by D-type flipflops 43, 45, 47, 49, and 51. The output on path 55 is obtained from the shift register chain of D-type flipflops 65, 63, 61, 59, and 57.

How many bits these shift registers must have in order to convert an initial determination of ternary "1" to a ternary "2" is considered. For example, if k is the maximum allowable clock time between adjacent peaks, it follows that since the peak following an initial ternary value of "1" can be as long as k+1 clock times later, then it is desirable to shift the ternary output symbols of the circuit in FIG. 10 into a "k+2" digit ternary right-shifting shift register. For the code in this disclosure, the value of k+2 is 5. The ternary digit is represented by the two binary bits called peak and half, i.e. the outputs on paths 21 and 41 respectively. As a consequence, there exists a (k+2) bit shift register for peak and a (k+2) bit shift register for half. The digit representing the previous peak is the position indicated by the leftmost "1" value in the peak shift register.

If the shift register positions are numbered 1, 2, . . . , k+2, then when the ternary digit positions mentioned in note 2 of FIG. 9 are to be right shifted into position 1, positions 2 through k+1 are to be considered the allowable node transition symbols of the maximum clock times between peak (value k) constraint. Further, the rightmost shift register position k+2 is the furthest position from the previous peak's digit position that could possibly receive the change.

For example, to consider the effect the change required by note 2 would have on a 5-digit shift register, consider the use of a "leading 1" detection circuit fed by the outputs of positions 1 through k+1 of the peak shift register in order to locate the bit value "1" in the lowest-numbered bit position. Suppose, for example, two half-transitions occur in adjacent clock times. The first half-transition will be in position 1 while the second would be detected by exclusive OR gate 37 and AND gate 39. The identified bit position by the "leading 1" detection logic circuit will be position 1. Therefore, position 2 of the half-shift register must have the value "1" after the shift. Thus, as the second half-transition value (ternary 2) is being shifted into position 1, the bit value "1" is being shifted into position 2 of the half-shift register. This converts the value from a ternary 1 to a ternary 2.

The circuit in FIG. 11 accepts the initial ternary values from the output on respective paths 21 and 41 of the circuit in FIG. 10. The FIG. 11 circuit selectively changes an initial ternary "1" symbol to a ternary value of "2" under specified conditions.

In FIG. 11, the interstage coupling between the register stages 65, 63, 61, 59, and 57 is by way of counterpart OR gates 81, 83, 85, and 87. One input of each counterpart OR gate is the output of the immediate adjacent D flipflop register stage. Thus, for example, to do the shift, one input of OR gate 83 is formed from the output of flipflop 63. A second input into the counterpart OR gate is formed from an AND gate. Thus, AND gates 67, 71, 75, and 79 are the respective second inputs to OR gates 81, 83, 85, and 87. During an operation which converts a ternary 1 to a ternary 2, only one of these AND gates is value TRUE, corresponding to the peak in flipflops 43, 45, 47, or 49 with the halftransition signal on path 41. The peak is determined by a priority determination circuit consisting of inverter 69, NOR gates 73 and 77, and AND gates 67, 71, 75, and 79.

In order to change a ternary 1 to ternary 2, such a change occurs during a shift by forcing a "1" into the lower (HALF) shift register instead of the "0" that would have been normally shifted therein. This change occurs when the output of the half-signal circuit is "1". The half thus "opens" AND gates 67, 71, 75, or 79 to the unique bit value of "1" in the peak register consisting of flipflops 43, 45, 47, and 49. This "1" is ORed into the appropriate data input of the half-shift register consisting of flipflops 63, 61, 59, and 57. In all other cases, the output of the AND gates is "0". This "0" is ORed with the bit value from the previous shift register stage in order to give the output of that data value.

FIG. 8 shows the conversion of the waveform to ternary. FIG. 8(a) is the original waveform and FIG. 8(b) shows the output of the peak detector of FIG. 7 for steps (1) and (2) of the algorithm. FIG. 8(c), top line, shows the state of flipflop 33, PREVPOL, of FIG. 10 for each time period for steps (1) and (2) of the algorithm. The second line of FIG. 8(c), whether the peak is the same as the previous, represents the output of XOR Invert gate 37 of FIG. 10 and step (3) of the algorithm. The third line of FIG. 8(c) represents the output peak, path 21, and half, path 41, at each step, which corresponds to steps (4) and (5) of the algorithm. These two binary signals are for the initial ternary value. Finally, the last line of FIG. 8(c) shows the output of FIG. 11, which corresponds to step (6) of the algorithm. For example, consider what happens at time "d", the second peak detected. The top line of FIG. 8(c) shows it to be positive and the second line has "yes", meaning the polarity is the same as the previous. The fourth line of FIG. 8(c) shows the ternary value is "2" since there was a half-transition. However, now the initial ternary of "1" must be converted for time "b". So, while the ternary value of time "d" is going to be shifted into flipflops 43 and 65, the ternary value for time "b" will be shifted into flipflops 47 and 61. The conversion of ternary 1 to ternary 2 is done through inverter 69, AND gate 71 (all of whose inputs are TRUE), and OR gate 61.

From the foregoing description, it will be apparent that there has been provided an improved system with the transmission and storage of digital information. It will be appreciated that the invention is also applicable to several forms of magnetic storage such as magnetic disk and drum as well as to data transmission in general. Variations and modifications in the described system within the scope of the invention will become apparent to those skilled in this art.

We claim:

1. A method for coding binary symbol strings into ternary symbol strings and for synchronously recording said ternary symbol strings onto a magnetic medium such that clocked recovery of the recorded signal may be subsequently made using peak position and polarity detection, comprising the steps of:
   (a) mapping a binary symbol string into a direction-constrained run length limited (RLL) ternary symbol string;
   (b) transforming the ternary symbol string into a clocked multilevel recording signal, said recording signal including signal levels in the range $-a < 0 < +a$, transitions between levels being made as either full-steps ($+a$ to $-a$, $-a$ to $+a$), or half-steps (0 to $\pm a$ or $\pm a$ to 0), consecutively occurring half-steps being limited to pairs of like polarity ($+a, +a; -a, -a$), half-steps of alternate polarity ($+a, -a; -a, +a$) being excluded; and
   (c) imprinting a magnetic medium with the recording signal.

2. A method according to claim 1, wherein the mapping step includes the steps of:
   (a) k-bit blocking of a binary symbol string; and
   (b) converting the blocked symbol string into a run length limited direction-constrained $n > k$-bit blocked ternary symbol string at a predetermined rate.

3. In a high-density, high-data rate, nonsaturated magnetic recording environment of signals consisting of (d,k) run length limited, directionconstrained, ternary symbol encodings of binaray symbol strings using peak position and polarity detection for the readback thereof, a method for binary symbol string recovery comprising the steps of:
   (a) reading back the recorded signals and detecting therefrom the presence of magnitude peaks and their polarities;
   (b) converting the detected peak polarities into ternary code symbols, the conversion including a maximum delay of (k+1) clock times; and
   (c) mapping the ternary code symbols into binary symbol strings.

4. A method according to claim 3, wherein in step (b) the delay is used to permit context decoding of half-steps, and further wherein in step (c) the number of ternary symbol lookahead blocks is a function of the (d,k) constraint and the code rate (k/n).

5. A method according to claim 3, wherein the mapping step includes the step of blocking the ternary symbols into length n and obtaining k<n length binary symbols by way of table lookup and a lookahead of a predetermined number of ternary symbol blocks.

* * * * *